(12) United States Patent
Zou et al.

(10) Patent No.: US 6,246,983 B1
(45) Date of Patent: *Jun. 12, 2001

(54) TEXT-TO-SPEECH E-MAIL READER WITH MULTI-MODAL REPLY PROCESSOR

(75) Inventors: Ranjun Zou, Irvine; Brian Hanson, Goleta, both of CA (US); Paul Liao, Fairhaven, NJ (US)

(73) Assignee: Matsushita Electric Corporation of America, Secaucus, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,649

(22) Filed: Aug. 5, 1998

(51) Int. Cl.[7] ............................. G10L 13/00; H04M 1/64; H04M 11/00
(52) U.S. Cl. ................... 704/260; 379/88.16; 379/93.18; 379/93.24
(58) Field of Search .................................. 704/258, 260, 704/270, 275; 379/88.07, 88.13, 88.16, 88.18, 88.23, 93.24, 93.25, 93.18; 395/683, 200.53, 200.68, 200.7

(56) References Cited

U.S. PATENT DOCUMENTS

| | | | | |
|---|---|---|---|---|
| 4,918,721 | * | 4/1990 | Hashimoto | 379/93.18 |
| 5,392,338 | * | 2/1995 | Danish et al. | 379/88.16 |
| 5,647,002 | * | 7/1997 | Brunson | 379/88.18 |
| 5,737,395 | * | 4/1998 | Irribarren | 379/88.13 |
| 5,757,891 | * | 5/1998 | Wang | 379/93.24 |
| 5,825,854 | * | 10/1998 | Larson et al. | 379/93.24 |
| 5,848,356 | * | 12/1998 | Jambhekar et al. | 455/403 |
| 5,894,506 | * | 4/1999 | Pinter | 379/88.23 |
| 6,049,697 | * | 4/2000 | Scozzarella et al. | 455/31.2 |

* cited by examiner

Primary Examiner—William R. Korzuch
Assistant Examiner—Martin Lerner
(74) Attorney, Agent, or Firm—Harness, Dickey & Pierce, P.L.C.

(57) ABSTRACT

A multi-user e-mail reader system allows several users to access their e-mail accounts simultaneously and have the e-mail messages played back with speech synthesis. The user navigates through various functional states of the system using either touch-tone keypad commands or optionally voiced commands interpreted by a speech recognizer. Users can send reply e-mail messages without the use of a computer, by invoking the system's text processor. The text processor operates in conjunction with a keypad-to-ASCII conversion mechanism that allows fully punctuated and properly addressed e-mail messages to be composed from the touch-tone phone. Digital audio sound file attachments may be recorded through the telephone handset and attached to an outgoing e-mail message. A system for storing canned messages allows the user to quickly send pre-composed reply messages, either as stored or after editing using the text processor. The text processor uses a virtual cursor pointer that may be indexed forward and backward at different granularities, depending on whether the system is in play mode or record mode. The granularity can also be changed by the user.

22 Claims, 5 Drawing Sheets

Figure 3

DTMF-to-ASCII Translation Table

|     | 0   | 1 | 2   | 3     | 4 | 5 | 6 | 7   | 8   | 9   |
|-----|-----|---|-----|-------|---|---|---|-----|-----|-----|
| 0   |     | q | z   | space | Q | Z | ( | ^Q  | ^Z  | )   |
| 1   | 0   | 1 | 2   | 3     | 4 | 5 | 6 | 7   | 8   | 9   |
| 2   | [   | a | b   | c     | A | B | C | ^A  | ^B  | ^C  |
| 3   | ]   | d | e   | f     | D | E | F | ^D  | ^E  | ^F  |
| 4   | {   | g | h   | i     | G | H | I | ^G  | ^H  | ^I  |
| 5   | }   | j | k   | l     | J | K | L | ^J  | ^K  | ^L  |
| 6   | +   | m | n   | o     | M | N | O | ^M  | ^N  | ^O  |
| 7   | -   | p | r   | s     | P | R | S | ^P  | ^R  | ^S  |
| 8   | *   | t | u   | v     | T | U | V | ^T  | ^U  | ^V  |
| 9   | /   | w | x   | y     | W | X | Y | ^W  | ^X  | ^Y  |
| 000 | !   | " | #   | $     | % | & | ' | ,   | .   | :   |
| 001 | ;   | < | =   | >     | ? | @ | \ | ^   | `   | \|  |
| 002 | ~   | _ | esc | fs    | gs| rs| us| del |     |     |

Note: To enter a key, press digit(s) of row first, then column.
^A-^Z are control keys. e.g., At&t4us = 24 81 0005 81 14 82 73

TEXT-TO-SPEECH E-MAIL READER WITH MULTI-MODAL REPLY PROCESSOR

BACKGROUND AND SUMMARY OF THE INVENTION

The present invention relates generally to text-to-speech synthesis and document processing. More particularly, the invention relates to an e-mail reader that may be operated using a telephone and which includes the capability to create and edit reply messages without the use of a keyboard.

E-mail and voicemail are rapidly becoming the communication means of choice for business people. Both of these modes of communication offer the important advantage of "time shifting" a communication so the originator and recipient do not need to be in direct communication at the same time. Time shifting provides the office worker with the convenience of ignoring incessant telephone interruptions without losing important business contacts. Time shifting also enables global companies to conduct business operations throughout the world, with virtual disregard of local time zones.

Whereas voicemail and e-mail provide similar time shifting benefits, for the most part, e-mail has heretofore been relegated to the computer. Unlike voicemail that can easily be accessed from a public telephone when traveling, e-mail suffers in that a computer, modem and Internet hookup are typically required. Although many business travelers carry laptop computers capable of accessing their e-mail account, using these takes time and quite a bit of trial and error to get working. Presently e-mail access is impractical in many situations, such as when using public telephones at the airport.

Some have developed text-to-speech systems that will do a reasonably good job of reading e-mail messages, and with some prior planning, these systems can be used to access one's e-mail account from a public telephone. However, present day text-to-speech e-mail reader systems do little more than replay all messages stored in the user's e-mail post office box. The user can hear the contents of an e-mail message, played via the text-to-speech synthesizer, but there is essentially no opportunity to compose and send a reply message by e-mail with these systems.

Without an easy to use and fairly robust mechanism to replay to e-mail messages, the full advantages of time shifted communication are not achieved.

The present invention overcomes this significant problem with present day e-mail reader systems. The invention uses a text-to-speech engine to play a user's e-mail messages, accessed from the user's post office box. The present invention will also allow the user to compose reply messages through a multi-modal dialog system that is well-adapted to a variety of different devices including the public telephone. Specifically, the invention permits a user to enter, edit, address and send complete e-mail messages using the touch tone keypad or optionally voice via voice recognition or digital audio sound files. The invention includes an ASCII encoder system that allows an e-mail message to be composed and addressed using the full ASCII character set, entered through a special technique using the touch tone phone's numeric keypad. Thus the invention allows a user to enter any valid e-mail address, even though the address includes one or more ASCII punctuation characters not found on the touch tone keypad.

To facilitate message editing, the invention includes a message editor that defines a virtual "cursor" to aid in moving forward and backward through the text message and to aid in making insertions and deletions. The virtual cursor is moved forward and backward in increments of variable granularity. In the message editing mode a one-word granularity is used by default. This allows the user to quickly move backward and forward in the message being composed, one word at a time. This one-word-at-a-time granularity is designed to facilitate use of precomposed message templates. The user can select an appropriate message template and then simply fill in the blanks.

The same virtual cursor is used in e-mail playback mode. Desirably, the granularity in playback mode can be different than that used in editing mode. The preferred system defaults to a one-message-at-a-time granularity, allowing the user to quickly advance forward and backward through an entire set of retrieved messages. The user can readily change granularity, as desired. Thus once a particular message is identified using a message granularity, the user can switch to a word granularity to more quickly play or replay a particular part of an individual message.

At times the user may wish to include voiced comments with an e-mail reply. The invention provides this facility through a user-invoked command that will append a digital audio sound file to an e-mail text message as an attachment. After entering the proper code to signify an attachment, the user then simply speaks into the telephone and the spoken message is digitally recorded and attached to the e-mail message.

For a more complete understanding of the invention, its objects and advantages, refer to the following specification and to the accompanying drawings.

BRIEF DESCRIPTION OF THE DRAWINGS

FIG. 3 is an exemplary ASCII translation table used by the e-mail reader;

DESCRIPTION OF THE PREFERRED EMBODIMENT

The e-mail reader of the invention is designed to allow a user to access an e-mail account using the telephone. Accordingly, in FIG. 1 a telephone network 10 has been illustrated. The telephone network can be accessed using a variety of different devices, including a conventional telephone device 12, or a cellular telephone 14, communicating through a suitable cellular telephone network 16. Although not illustrated here, other types of mobile communication equipment can be used, including personal telephones that communicate with telephone network 10 via a satellite.

Figure 1:
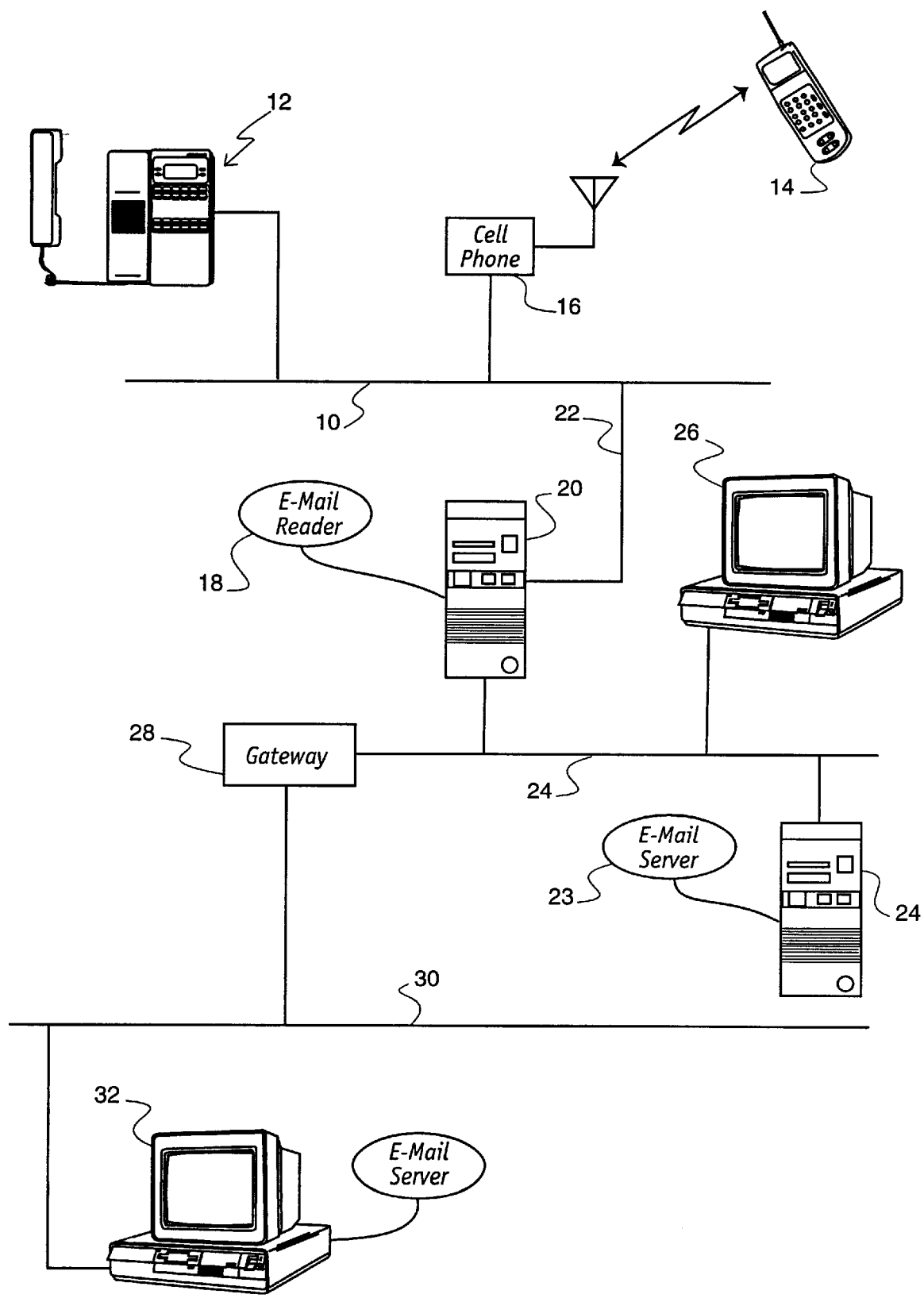
FIG. 1 is a block diagram giving an overview of the system architecture in which the invention may be employed.

The e-mail reader of the invention is preferably a computer-implemented software program run on a suitable computer. As illustrated in FIG. 1, e-mail reader software program 18 may run on the e-mail server computer 20. The server computer 20 may be coupled through a suitable telephone line 22 to the telephone network. Computer 20 can be any commercially available computer system, equipped with a telephone interface card such as a multi-line telephone card from Dialogic or one or more Phone Blaster cards available from Creative Labs, or the like. The presently preferred embodiment is designed to run on a Microsoft Windows 95/NT Operating System, although other computer systems, including UNIX Systems may be used, as well.

Alternatively, computer 20 may be dedicated to hosting the e-mail reader, with a separate computer, such as computer 21 serving as host for the e-mail server program 23. Either of computers 20 and 21 may also host other systems, as well and other variations of the system illustrated in FIG. 1 are also possible.

Although not required, the e-mail reader computer 20 can be attached to a local area network, such as LAN 24. The connection can be made through a suitable network interface connection via Ethernet or the like. The presently preferred implementation allows the e-mail reader system administrator to access the e-mail reader software using a workstation 26 attached to LAN 24 or a console (monitor, keyboard and mouse) attached to server computer 20. Alternatively, e-mail reader administration can be done from a workstation connected to the Internet.

As will be more fully explained below, the e-mail reader computer 20 is able to access the existing e-mail system on which the user has a designated account. The e-mail reader of the invention is capable of interacting with both internal, inter-office e-mail systems and external, Internet e-mail systems. To provide Internet access the local area network 24 may be coupled through a gateway 28 to the Internet 30. Gateway 28 may be any suitable computer system connected to one of a variety of different Internet service providers. By connecting the local area network 24 to the Internet 30, a third party using a workstation or computer 32 may connect to the Internet and send e-mail to the local area network 24 where the e-mail reader may access it. Alternatively, the e-mail reader system of the invention can access Internet e-mail accounts that are not resident on the local area network. The e-mail reader has post office account accessing capability allowing the e-mail reader to log onto a remote e-mail server in order to download e-mail messages on behalf of a user of the e-mail reader system. In FIG. 1, the remote post office account could reside on computer 32, for example.

Figure 2:
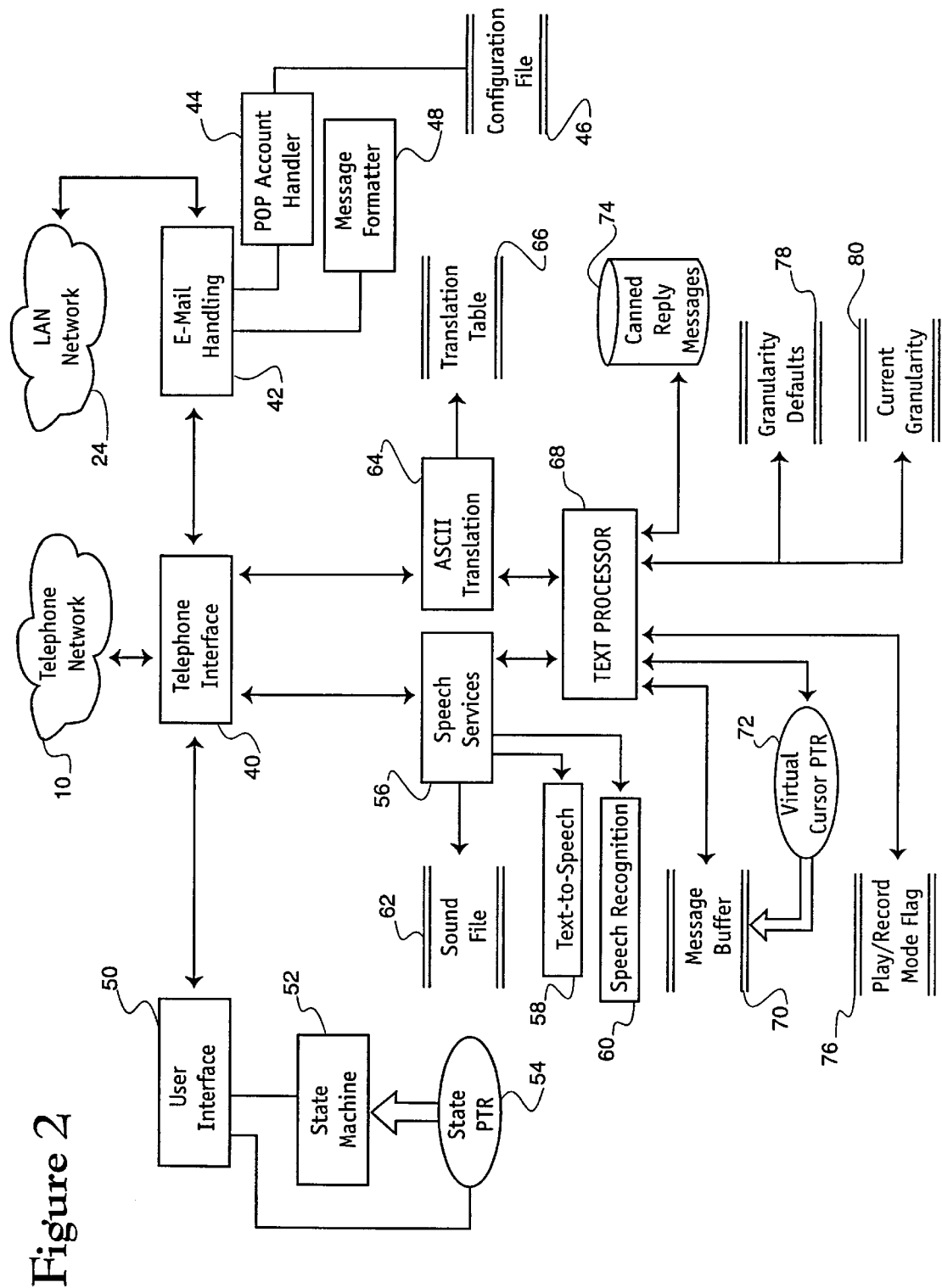
FIG. 2 is a system block diagram of the preferred embodiment of the e-mail reader.

The presently preferred embodiment or implementation of the e-mail reader comprises an interconnected arrangement of software modules that provide the functionality illustrated in FIG. 2. Because the preferred embodiment of the invention accesses both telephone network 10 and local area network or LAN 24, these have been illustrated diagrammatically in FIG. 2.

The e-mail reader includes telephone interface module 40 that provides the functionality needed to communicate with telephone network 10. Telephone interface 40 is preferably configured to support the TAPI application program interface defined by the Microsoft Windows 95/NT Standard, which ensures telephone interface 40 can talk to any telephone board hardware that has a TAPI driver. Telephone interface 40 thus provides telephone dialer functions as well as digital audio input and output signal routing. In this regard, audio input serves as the principal means of communicating with the e-mail reader from a telephone handset. Touch-tone codes (DTMF codes) and voice supply multimodal input commands for controlling the e-mail reader's functionality as well as for supplying and editing text messages. Digital audio sound file attachments that are appended to e-mail messages are also supplied via the audio input capabilities of telephone interface 40. The audio output services provided by interface 40 supply synthesized speech prompts and help file information to the user as well as a playback of the e-mail messages being read.

An e-mail handling module 42 supplies the functionality needed to process e-mail messages. E-mail handling module 42 is illustrated in communication with local area network 24, as this would be typical configuration in most office environments. It will be recognized, however, that the e-mail handling functions may involve the telephone interface module 40, where connection to the inter-office e-mail system or Internet e-mail system is made through dial-up telephone lines.

The e-mail handling module 42 employs a post office protocol account handler 44. The presently preferred embodiment supports the POP3 and MAPI protocols. Other protocols may be implemented as well. The account handler is primarily involved in accessing a user's e-mail post office box account and downloading any messages into the e-mail reader system for replay and other processing. The account handler 44 employs a configuration file 46 that stores the pertinent information needed to access each user's e-mail account. In the presently preferred embodiment, a personal identification number (PIN) and access code are required to logon to the e-mail reader, while account name, user name and password are needed to download e-mail messages from an e-mail server based on a POP3 protocol or the like.

SMTP and Exchange Servers do not require a password, hence a password need not be stored in the configuration file 46 in such implementations. SMTP is used to send messages. The SMTP protocol employs no security mechanism. The preferred embodiment e-mail reader runs under a privileged account, hence it can access all messages for all users in an Exchange Server environment without the need to supply a password. In this embodiment the e-mail reader and Exchange Server are integrated.

For security the access code and passwords are encrypted in the configuration file so that they may be read and decoded only by the account handler 44. To ensure the privacy and security of each user of the e-mail reader system, the account handler will not retrieve e-mail messages from a user's e-mail account unless a PIN and corresponding access code are supplied to the e-mail reader. The presently preferred embodiment is designed to allow each user to enter the PIN and access code using the touch-tone buttons of the telephone. The combination of PIN and access code serves as the unique key that is used to access the configuration file 46 for that user. The account handler 44 retrieves the necessary account name, user name and password (if required) to download e-mail messages.

Note that the PIN and access code used to access the e-mail reader can be different than the user name and password employed to access the e-mail account from a local area network terminal. This offers convenience to the business traveler because the e-mail reader password can be a simple sequence of numeric digits easily input through the touch-tone phone, whereas many local area network e-mail systems require considerably longer and more complex passwords to be entered.

After PIN and access codes have been verified, the e-mail handling module 42 connects to the e-mail server for that user as identified in configuration file 46. The handling module negotiates with the e-mail server, passing the user's name and e-mail password (if required) to the server. Once this log-on procedure is complete, the server sends a list of all currently pending e-mail messages for that user together with the message size of each message. The e-mail handling module uses the message size data to allocate memory space within the random access memory of the e-mail reader computer 20.

Although different message downloading sequences may be employed, the presently preferred embodiment requests the mail server to send the first 100 messages. This is the default setting for the preferred embodiment. Typically a user will have fewer than 100 messages, hence this request will usually result in downloading all of the user's e-mail messages that are currently pending on the e-mail server. These messages are stored in the allocated memory of computer 20. The e-mail handling module then analyzes each message, determining which messages (if any) correspond to high priority messages that the system may treat as "Hot List" messages. Any attachments appended to messages are also downloaded at this time. If the attachments are in a pre-defined file format, such as a Microsoft Word document format, these may be decoded using either the full program (e.g., Microsoft Word) or a suitable file translation or file reader program. Digital audio sound file attachments may be stored in an associated sound file buffer, such as sound file buffer 62, discussed below.

The e-mail handling module 42 also includes a message formatter 48 that is primarily responsible for ensuring that e-mail reply messages sent by the e-mail reader system are properly formatted. The message formatter 48 attaches the appropriate e-mail addressing labels to the text messages generated by the e-mail reader system. The message formatter also handles the encoding of digital audio sound files so that they may be appended to a text message using a suitable document attachment protocol. In this regard, the presently preferred embodiment uses the MIME protocol for document attachments. As will be further explained below, the user can append spoken sound file messages to an e-mail message reply simply by speaking into the telephone handset and then commanding the e-mail reader to attach the spoken message to the text document.

Unlike most conventional computer programs, the e-mail reader of the presently preferred embodiment employs a multi-modal, audio-based user interface. The e-mail reader system supplies prompts and help file information as synthesized speech sent through the audio output channel to the telephone handset. The system responds to commands supplied by the user through the audio input channel either as touch-tone phone signals or as voiced commands that are interpreted by the system's speech recognizer.

Figure 4:
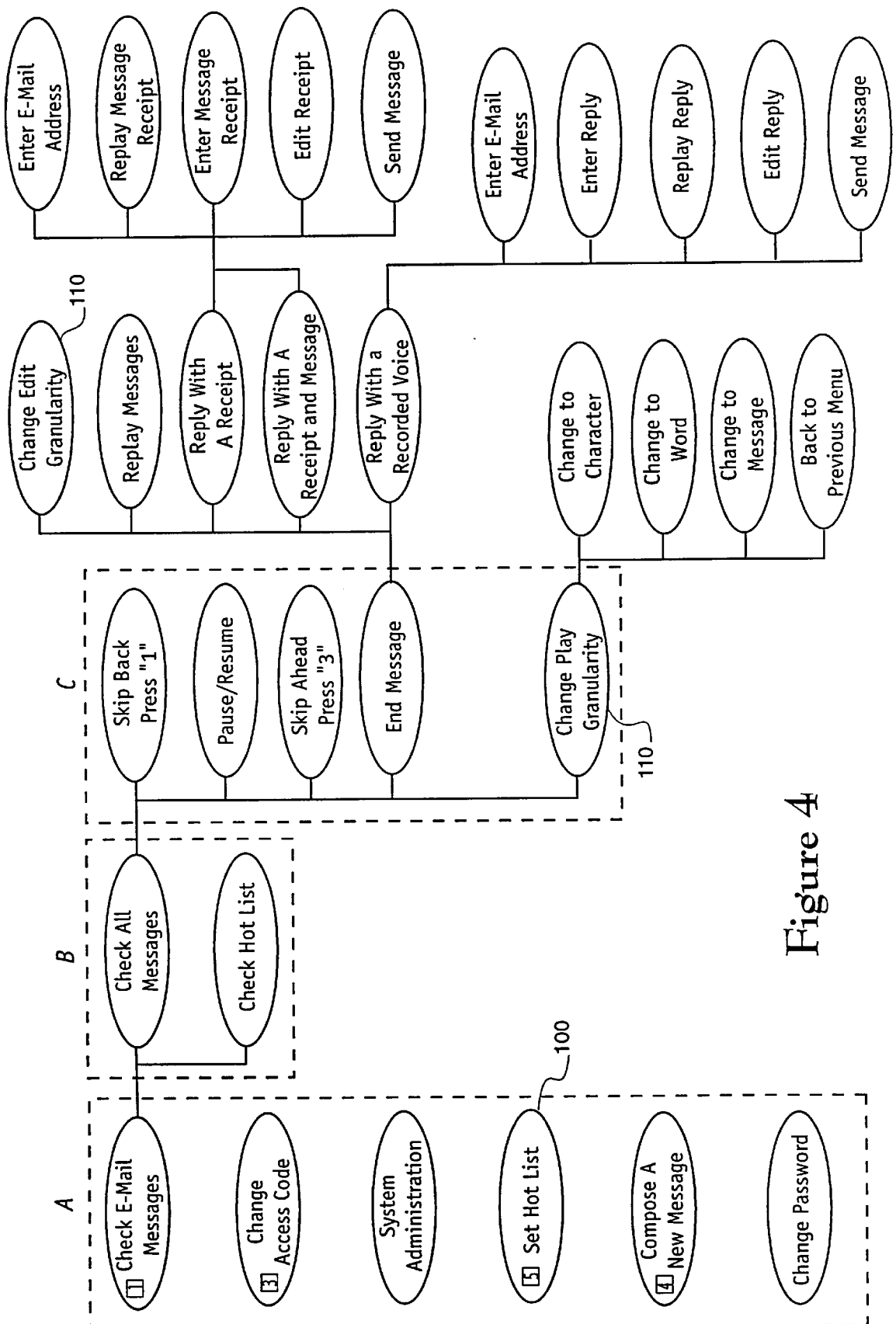
FIG. 4 is a state machine diagram showing the operation of the e-mail reader user interface.

User interface 50 implements a state machine 52 that defines a plurality of hierarchically arranged operational states. The presently preferred embodiment implements the operational states illustrated diagrammatically in FIG. 4 and in further detail in the Appendix below. FIG. 4 may be thought of as a series of menus that the user may navigate through by entering the appropriate commands through the user interface module 50. The user interface module maintains a state pointer 54 that keeps track of the current state. As will seen from the discussion below, the e-mail reader performs certain text message processing functions differently, depending on what state the e-mail system is in. The states are designed to be intuitive with emphasis on convenience. The most frequently used commands are placed higher in the menu hierarchy and there may be multiple paths to reach the more frequently accessed states. For example, in the preferred embodiment the '*' key always jumps to the head of the main menu A described next.

Referring to FIG. 4, the operational states of state machine 52 are hierarchically arranged. For convenience, the letters A, B and C have been used to designate the highest three states, with state A representing the head or start of the main menu. The presently preferred embodiment is implemented as multithreaded code so that several users can interact with the e-mail reader concurrently. The system generates a state pointer instance for each active user, so that the interaction with each active user can be in a different state. For example, a first user may be at state A, in process of checking e-mail messages, while a second user may at the same time be in state C in process of ending a message. In this way, multi users can take advantage of the e-mail reader at the same time. When a user logs off the system the state pointer instance for that user is deallocated.

Navigation through the state machine is effected by entering touch-tone commands or alternately by entering voiced commands that are interpreted by speech recognizer 60.

Although most of the states or menu selections are self-explanatory, several bear further comment. The set Hot List state 100 (on the main menu A) prompts the user to enter the name of the sending party for whom a Hot List entry should be made. As described elsewhere in this specification, the Hot List allows the user to identify certain e-mail senders for whom the user wants to assign higher priority during message playback.

The change granularity selection 110, accessible at various points across the menu hierarchy, allows the user to change the granularity with which the cursor pointer is indexed as the user moves forward or backward through a message or series of messages. As explained elsewhere in this specification, the user may elect to index or step through individual messages, one message-at-a-time, when browsing the contents of a group of newly downloaded messages. The user may wish to select to a one word-at-a-time granularity in order to replay the portion of a message, such as an important address or phone number. Similarly, when the user is in the message record mode (composing a message to be sent) a one word granularity may be initially selected to index to a portion of the message the user wishes to edit. Thereafter, the user may wish to switch to a single character granularity to correct the spelling of a word in the message buffer.

Consistent with the multi-modal nature of the preferred embodiment, the e-mail reader system includes a plurality of speech technology functions provided by speech services module 56. The speech services module employs a text-to-speech engine 58 and an optional speech recognition module 60. The text-to-speech engine is the principal component used by the e-mail reader to play synthesized voice renditions of e-mail messages downloaded from the user's e-mail post office account. The speech recognizer 60 decodes voiced user commands that may be entered instead of touch-tone commands to effect state machine navigation. The speech services module 56 maintains a sound file buffer 62 that may be used to store digital audio sound files entered by the user through the telephone handset. These sound files are then formatted by the message formatter 48 to construct the digital audio sound file attachments.

The text-to-speech engine is capable of text message playback from any location within a text message document. A virtual cursor pointer identifies the current position within a text message and the text-to-speech engine automatically begins reading at the cursor location. To facilitate operation over a telephone, the playback system will automatically play e-mail messages, one after another, without requiring interaction from the user. The user can interrupt the automatic message replay by pressing pre-assigned touch-tone commands to invoke pause, fast-forward, rewind, stop and skip-to-next-message functions. The playback system can also be placed in a brief reading mode where the first sentence of each paragraph of the message is played back with the remaining text being skipped. The system will decode e-mail attachments as well as plain text messages.

The playback system of the e-mail reader also supports a Hot List playback capability. The user identifies in advance certain e-mail senders that the user wishes to be given a higher priority for playback. Thus the user can designate one or more Hot List senders that the user can assign to different keypad buttons. The user could, for example, assign keypad button 1 to his or her boss and assign keypad button 2 to a personal friend. Then, by navigating to the Hot List playback state, the user can replay only messages from the boss by pressing keypad 1, or playback messages only from the friend by pressing keypad 2.

Entry of numeric digits using the touch-tone phone is relatively straightforward. However, to be useful as an e-mail message handler, the system must support a complete alphabet, including the requisite punctuation marks needed for sentence construction and for e-mail address construction. To provide this functionality, the e-mail reader employs an ASCII translation module 64 with an associated translation table 66. The ASCII translation module converts sequences of numeric digits entered through the touch-tone phone into ASCII characters based on the translation table 66.

Details of the presently preferred translation table are shown in FIG. 3. The ASCII translation module will decode a sequence of touch-tone commands into a corresponding ASCII character as specified in the translation table 66.

Referring to FIG. 3, note that most ASCII characters are formed by entering pairs of touch-tone codes. For example, the letter 'd' corresponds to touch-tone sequence '31' and the letter 'D' corresponds to the touch-tone sequence '34'. Note that some ASCII characters require more than two touch-tone codes. For instance, the '@' is entered by the touch-tone sequence '0015'. Also note that support is provided for a series of control keys, as well as other function keys or special purpose keys, as desired. The '00...' combination allows quite a number of additional special characters or special keyboard keystrokes to be emulated. Thus, although the translation table illustrated in FIG. 3 ends at Row '002', the technique illustrated can readily be extended to additional rows (e.g., '003 . . . 009'). In the table illustrated in FIG. 3, the following ASCII abreviations are used: esc—escape key, fs—less than (i.e., <), gs—equal (i.e, =), rs—greater than (i.e., >), us—question mark (i.e., ?), del—delete. For the user's convenience a wallet-sized card may be printed in a look-up table or matrix, generally as illustrated in FIG. 3.

The preferred embodiment uses a convenient pneumonic to make it easy to remember the touch-tone codes. The rules for entering 'a'–'z', 'A'–'Z' and '1'–'9' are as follows. For 'a'–'z' (lowercase) push the touch-tone key with the corresponding letter, followed by the number 1, 2, or 3, corresponding to the position of that letter on the touch-tone keypad. For example, the letter 'a' is entered by pressing touch-tone keys 2..1; the letter 'b' is entered by pressing touch-tone keys 2..2; the letter 'c', keys 2..3. For uppercase letters push the touch-tone key with the corresponding letter, followed by the number 4, 5 or 6 corresponding to the position of that letter on the touch-tone keypad. For example, the letter 'A' is entered by pressing touch-tone keys 2..4; the letter 'B' is entered by pressing touch-tone keys 2..5; the letter 'C', keys 2..6. Digits '0'–'9' are entered by pushing the number 1 followed by the desired digit. For example, the number '6' is entered by pressing touch-tone keys 1..6.

At the heart of the e-mail reader is the text processor module 68. The text processor module is principally involved in the composing, editing and playback of e-mail messages. The text processor module maintains a message buffer 70 into which one or more messages may be stored for processing. The message buffer may store only a single text message during message composition, or it may store a plurality of individually indexed messages downloaded during message retrieval and playback. The text processor 68 maintains a virtual cursor pointer 72 that points to the location within the message buffer where the next character will be inserted or where the text-to-speech engine will begin reading. To simplify sending simple reply messages the text processor includes a data store 74 of canned reply messages. These may be selected via the user interface and the text processor then copies the selected message into message buffer 70. Once in the message buffer, the message can be sent to the message formatter 48 for sending as an e-mail message, or it may be first edited and then sent.

The canned reply messages can save a great deal of time and are particularly useful when the e-mail reader system is being used to keep up with e-mail correspondence during business trips or vacation. The e-mail system administrator or user can create custom canned messages in advance, using these later while traveling. For example, a user might elect to use a simple reply message:

"I received your e-mail message and I will reply more fully once I have returned to the office."

The above canned message may be readily edited using text processor 68 to add the date the user will return to the office, for example.

Another useful canned message is the following:

"I received your e-mail message, but I am currently traveling and do not have an opportunity to send a written reply. Attached to this message is a digital audio sound file that I have recorded through the telephone. You may listen to it by double-clicking on the Icon."

Using canned text messages, that may be optionally edited or augmented, and supplementing these text messages with digital audio sound files the user is able to maintain a rich e-mail dialog without ever logging onto the Internet using a computer in the conventional sense.

Figure 5:
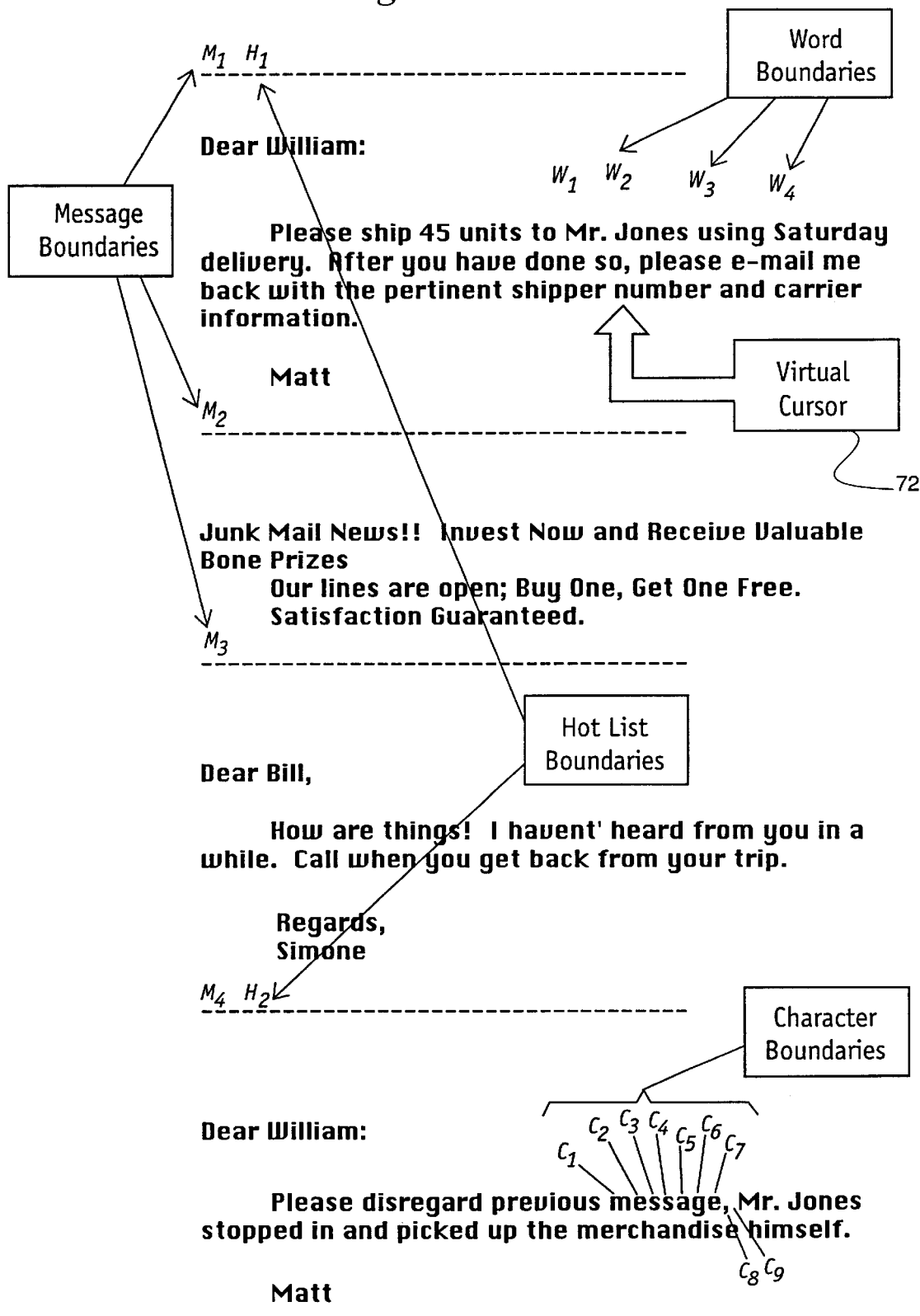
FIG. 5 is a text messages diagram illustrating the virtual pointer and granularity concepts.

The text processor maintains a play/record mode flag 76 that maintains a state record of whether the message accessed by the virtual cursor pointer is currently being sent through the speech services module 56 for replay through telephone interface 40 (play mode) or currently being edited via speech services or ASCII translation (record mode). The text processor navigates through text contained in the message buffer by moving the virtual cursor pointer 72 forward or backward within the stored text message. The text processor increments or decrements the virtual cursor pointer by a pre-defined amount referred to herein as the index granularity. For reasons that will be explained, the granularity used during play mode can be different than the granularity used in record mode. In the play mode the user will most frequently want to advance forward and backward an entire message at a time. Thus in the play mode the default granularity is set to jump to the message boundary. This is shown in FIG. 5. In FIG. 5, the message boundaries are indicated by reference nomenclature $M_1$ and $M_2$.

In the record mode, the user will typically want to index forward or backward through a single document, one word at a time. Thus in the record mode the default granularity is set to the word boundary. In FIG. 5 this is shown by the nomenclature $W_1, W_2 \ldots W_n$. The default granularities are stored in granularity defaults data store 78. Naturally, different implementations of the e-mail reader system could use different default granularities, as desired. The message boundary and word boundary granularities are merely two of the possible choices. The system also recognizes the more microscopic character boundary, designated as $c_1 \ldots c_n$ in FIG. 5; and the more macroscopic Hot List boundaries, designated $H_1, H_2$ in FIG. 5. These boundaries will now be described, beginning with the character boundary. As illustrated, every character, including white space characters, is separated from its adjacent neighbors by a character boundary. Thus the user may select the character granularity to index through the text message one letter at a time. The more macroscopic Hot List boundary involves distinguishing between different types of messages. The Hot List granularity involves a pre-processing step in which certain messages are flagged as being more important and thus belonging to the Hot List. This may be done by the e-mail handling module 42 or alternately by the text processor module 68. When the Hot List granularity is selected, the cursor pointer indexes one document at a time, but skipping any documents that have not been flagged as belonging to the Hot List.

The granularity applied to a particular message is user selectable through the user interface. The text processor maintains a record of the current granularity settings in current in current granularity store 80.

In FIG. 5 the virtual cursor pointer 72 is positioned within the final sentence of the first message $M_1$. Specifically, the virtual cursor points to the white space between the words "number" and "and." Note that two messages ($M_1$ and $M_4$) have been designated as Hot List messages. Thus these two messages also include the $H_1$ and $H_2$ flags, respectively. These flags may be set by the e-mail handler 42 by examining the identity of the person sending the messages in the e-mail header file. In the illustrated example messages $M_1$ and $M_4$ are from the same sender, namely "Matt." Use of a Hot List flag as illustrated in FIG. 5 is merely one way to implement the Hot List feature. Another alternative is to compare the sender's address designation each time the user instructs the text processor to jump to the next message. When the Hot List mode has been invoked, messages that are not from the Hot List sender are simply skipped.

If desired, the e-mail reader system can be implemented to allow the user to pre-designate or select a plurality of different Hot List senders. In this way, messages can be filtered to replay only those sent from one of the designated Hot List senders. Alternatively, the system can be configured to apply the Hot List principle in reverse. An exclusion list is constructed and messages from the excluded sender are skipped as the user indexes virtual cursor 72 at a message boundary granularity.

What is claimed is:

1. A text-to-speech reader for automated speech processing of text messages comprising:
   a telephone interface for coupling to a telephone network through which a user interacts with said reader;
   a memory for storing data representing an e-mail text document to be processed;
   a text-to-speech engine for generating synthesized speech;
   a state machine operable by the user through said telephone interface to switch between a play mode and a record mode;
   a text processor coupled to said state machine and to said memory and to said text-to-speech engine, said text processor having an associated data store containing at least one canned e-mail reply message and being responsive to said state machine such that:
   (a) when said state machine is in said play mode said data is supplied to said text-to-speech engine for playback as synthesized speech through said telephone interface, and
   (b) when said state machine is in said record mode said text processor receives input signals supplied by the user through said telephone interface and selectively loads said canned message into said memory and selectively edits the content of said canned message based on said input signals;
   said text processor having a user-controllable cursor indexing mechanism to selectively identify plural positions within said canned e-mail reply message such that words and characters can be inserted and deleted from any point within said message when said state machine is in said record mode.

2. The apparatus of claim 1 wherein said text processor maintains a virtual cursor pointer that identifies an indexed location within said memory corresponding to a first position within said text document to be processed.

3. The apparatus of claim 2 wherein said text processor further includes a user interface coupled to said telephone interface through which the user by keypad entry or voice control relocates said virtual cursor pointer to move to a second position within said text document to be processed.

4. The apparatus of claim 1 further comprising e-mail handler for formatting said data as e-mail messages.

5. The apparatus of claim 1 further comprising e-mail handler adapted for communicating with a computer network to send said data as e-mail messages over said network.

6. The apparatus of claim 1 further comprising e-mail handler adapted for communicating with a computer network and for receiving e-mail messages from said network and storing said e-mail messages as said data in said memory.

7. The apparatus of claim 1 further comprising e-mail handler adapted for communicating with a computer network to send said data as e-mail messages over said network and for sending digital audio sound files as attachments to said e-mail messages.

8. The apparatus of claim 1 further comprising sound file buffer for storing digital audio sound files input through said telephone interface.

9. The apparatus of claim 1 further comprising:
   sound file buffer for storing digital audio sound files input through said telephone interface; and
   e-mail handler adapted for communicating with a computer network to send said data as e-mail messages over said network and for sending said digital audio sound files as attachments to said e-mail messages.

10. The apparatus of claim 1 wherein said text processor includes character translation system that converts touch tone codes entered through said telephone interface by keypad entry or voice into characters of an alphabet that includes white space and punctuation marks.

11. The apparatus of claim 10 wherein said alphabet includes at least a subset of the ASCII character set.

12. The apparatus of claim 1 wherein said text processor includes a data store of canned reply messages selectable by the user via said telephone interface.

13. An e-mail message processor operable using the numeric keypad of a telephone coupled to a telephone network, comprising:

a telephone interface for coupling to said telephone network;

a text processor coupled to said telephone interface for processing an e-mail message, including e-mail handler mechanism for attaching e-mail address data to said e-mail messages; and character translation system coupled to at least one of said telephone interface and said text processor for converting numeric keypad codes entered through said telephone interface into characters of an alphabet that includes punctuation marks;

wherein said text processor includes a state machine that defines at least one play state and at least one text editing record state;

wherein said text processor maintains a virtual cursor pointer that identifies a predetermined location within said e-mail message;

wherein said text processor includes a cursor indexing mechanism that automatically adjusts the position of said virtual cursor pointer by different predefined user-selectable amounts, depending on whether said state machine is in said play state or said text editing record state such that words and characters can be inserted and deleted from any point within said message when said state machine is in said record state; and wherein the virtual cursor is automatically adjusted to present information in different amounts in the play state and text editing record state.

14. The message processor of claim 13 wherein said alphabet includes a white space character.

15. The message processor of claim 13 wherein said alphabet includes at least a subset of the ASCII character set.

16. The message processor of claim 13 wherein said text processor includes a data store of canned reply messages selectable via said telephone interface.

17. The message processor of claim 13 wherein said e-mail handler mechanism includes a port for coupling to a computer network.

18. The message processor of claim 13 further comprising sound file buffer for storing a digital audio sound file input through said telephone interface.

19. The message processor of claim 18 wherein said text processor includes file attachment mechanism for appending said digital audio sound file as an e-mail attachment to said e-mail message.

20. The message processor of claim 13 further comprising text-to-speech engine for generating synthesized speech and coupled to said text processor for playback of said e-mail message as synthesized speech through said telephone interface.

21. The message processor of claim 13 wherein said text processor maintains a virtual cursor pointer that identifies a predetermined location within said e-mail message and further comprises a cursor indexing mechanism that adjusts the position of said virtual cursor pointer by a user-selectable amount.

22. The message processor of claim 13 wherein said text processor includes a state machine that defines at least one play state and at least one record state.

* * * * *